United States Patent Office 3,521,327
Patented July 21, 1970

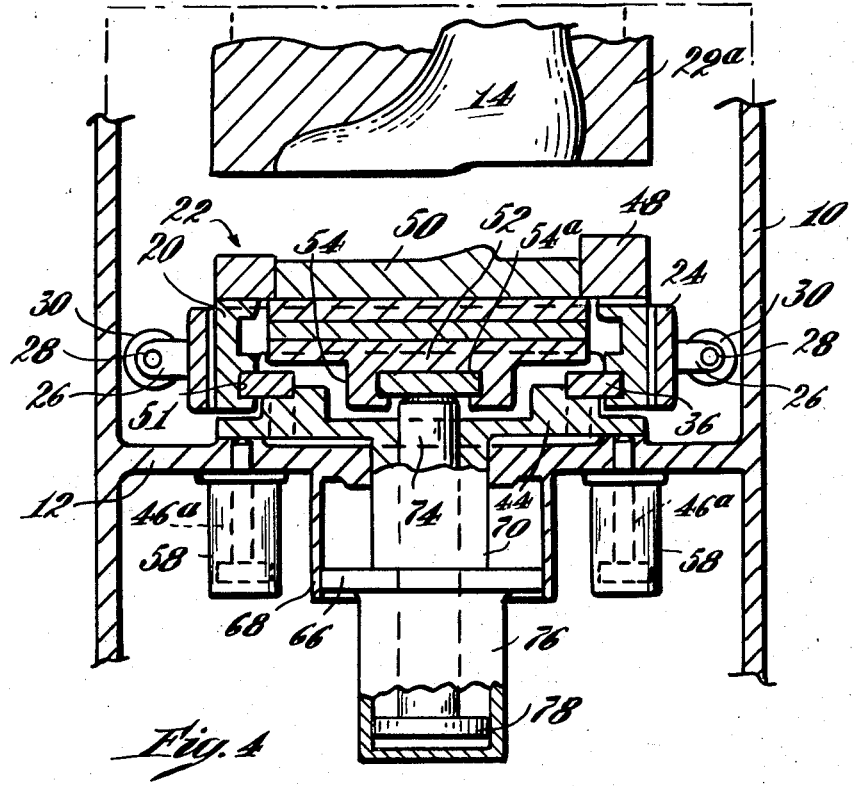
Fig. 4
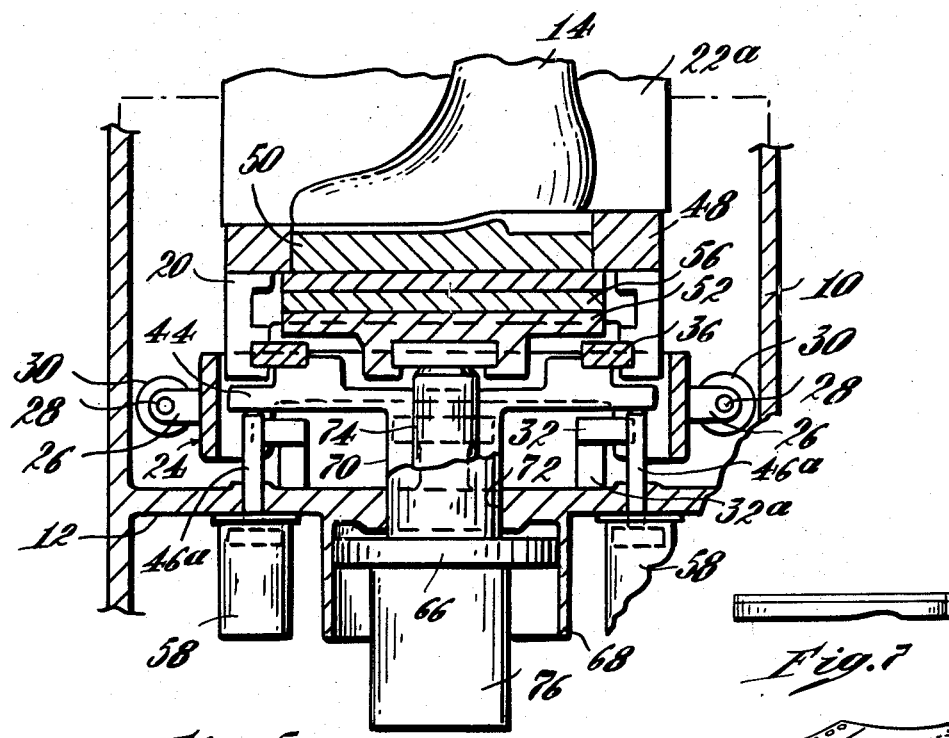
Fig. 5
Fig. 7
Fig. 6

3,521,327
APPARATUS FOR FORMING BOTTOM TO SHOE
UPPERS BY INJECTION MOLDING
Lothar Fink, Baden, and Friedrich Koch, Achim, Germany, assignors to Desma-Werke GmbH
Filed Mar. 1, 1968, Ser. No. 709,723
Claims priority, application Germany, Apr. 21, 1967,
D 52,874
Int. Cl. B29h 5/12; B29c 3/02
U.S. Cl. 18—17
15 Claims

ABSTRACT OF THE DISCLOSURE

A last upon which a shoe upper is adapted to be supported and two open top bottom mold assemblies supported below the last for lateral movement to place one or the other in confronting relation to the bottom of the last, each mold assembly having a ring and sole plate, a motor for raising and lowering each mold assembly in turn when located in confronting relation to the bottom of the last toward and from the bottom of the last, and a motor for raising and lowering the sole plate relative to the ring at said position confronting the bottom of the last.

BACKGROUND OF THE INVENTION

U.S. Pat. Nos. 3,128,505 and 3,160,921, dated Apr. 14, 1964, and Dec. 15, 1964, respectively, show injection molding apparatus wherein bottom molds of different dimensions are alternatively positionable adjacent the bottom of a last to enable making a first injection of one thickness or kind of material followed by a second injection of the same or different thickness and/or kind of material. This apparatus, however, is not sufficiently versatile in that it is not possible to vary the thickness of the different layers nor to vary the pressure applied nor to provide for expansion of the layers. It is accordingly the purpose of this invention to remedy the disadvantages of the currently available injection apparatus by providing apparatus which enables infinite variation in the thickness and pressure; to provide an apparatus in which variations in thickness and pressure can be made without manual adjustment and/or replacement of parts; to provide an apparatus in which such variations can be performed easily and quickly; and to provide an apparatus in which such variations may be effected semiautomatically.

SUMMARY

As herein illustrated, the apparatus comprises the combination of a last upon which an upper is adapted to be mounted for attachment of a bottom thereo, of two open top bottom mold assemblies of variable depth for receiving bottom-forming composition, said bottom mold assemblies being alternately movable to a position confronting the bottom of the last and each bottom mold assembly being movable relative to the bottom of the last while at said confronting position to bring the open top of the mold into engagement with the bottom of the last. A tractor frame contains the two mold assemblies, each of which comprises a ring and sole plate and is movable laterally with respect to the last alternately to position one or the other of the assemblies beneath the last. Each assembly is movable on the tractor frame independently of the other and there is elevator means at the position confronting the bottom of the last operable to raise the assembly at that position for engaging the mold ring with the lasting margin of an upper mounted on the last. There is also means at the aforesaid confronting position for raising and lowering the sole plate relative to the ring. The means for raising and lowering the sole plate relative to the ring comprises an elevator plate on which there are track sections adapted to be aligned with other track sections located at each side of the last, but movable in elevation independently thereof onto which the mold assemblies may be moved from the lateral track section to enable moving a mold on the elevator plate, situated below the last, upwardly while the other mold assembly remains unmoved.

The invention will now be described in greater detail with reference to the accompanying drawings wherein:

FIG. 4 is a view taken transversely of the apparatus, partly in section and partly in elevation and to much larger scale, showing the mold assembly in confronting relation to the bottom of the last prior to elevation and showing its composite parts;

FIG. 5 is a view corresponding to FIG. 4, showing the mold assembly raised to a position of engagement of the mold ring with the bottom of the last;

FIG. 6 is an elevation of a shoe to which a bottom has been attached by means of the apparatus herein illustrated; and FIG. 7 is an elevation of an unattached bottom which may be made by means of the apparatus herein illustrated.

Figure 1:
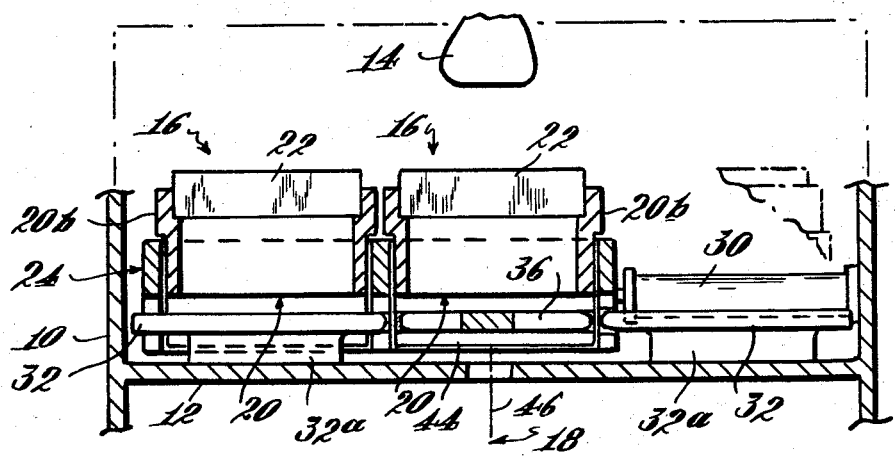
FIG. 1 is an elevation, partly in section, schematically illustrating two mold assemblies supported below a last upon which an upper is adapted to be supported, with one assembly in confronting relation thereto and the other situated laterally to one side thereof.
Figure 2:
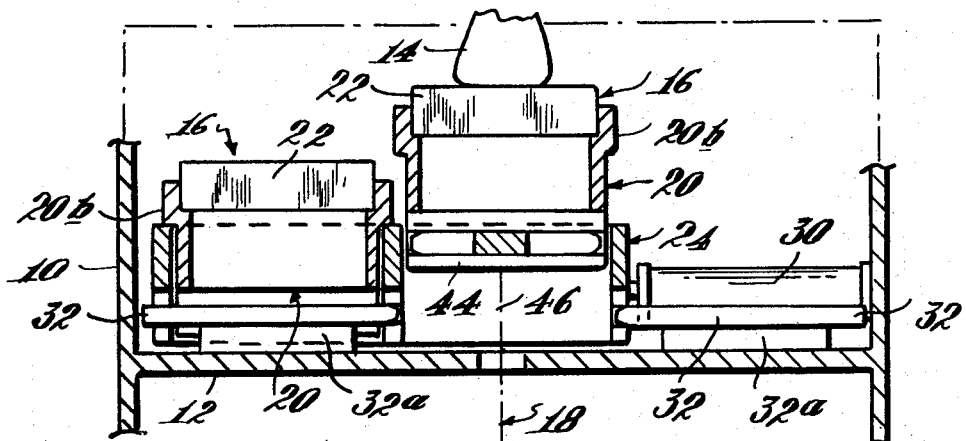
FIG. 2 is a corresponding elevation schematically illustrating the mold assembly confronting the bottom of the last raised to a position of engagement of the mold ring with the bottom of the last.
Figure 3:
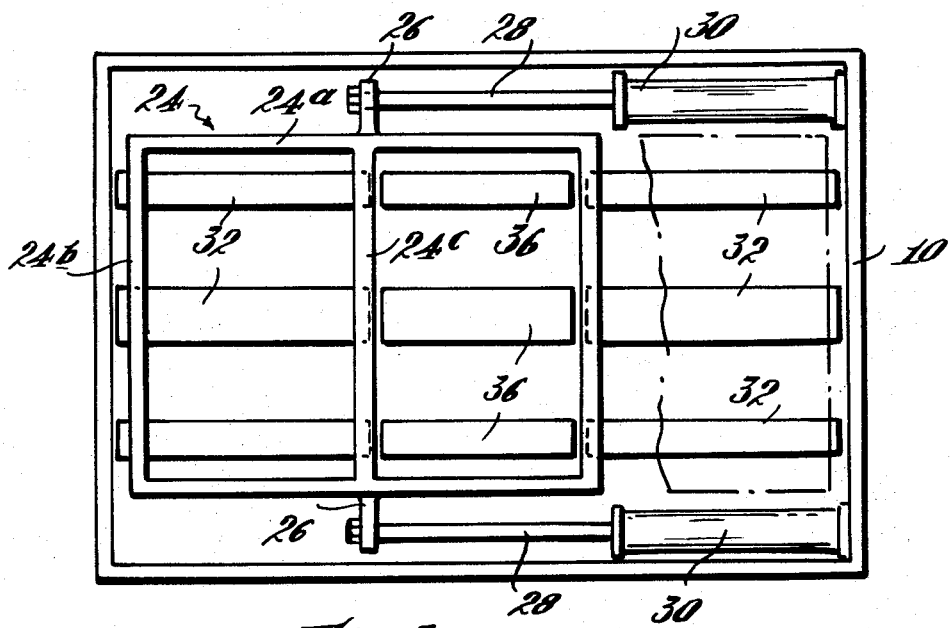
FIG. 3 is a plan view of the apparatus with the last omitted, showing the tractor frame for moving the mold assemblies transversely of the last.

Referring to the drawings, FIGS. 1, 2 and 3 illustrate the apparatus schematically as comprising, in combination, a machine frame 10 having a horizontal supporting bed 12, a last 14 supported by the frame above the bed 12, and two mold assemblies 16 mounted on the bed below the last for movement transversely with respect thereto, alternately to position one or the other of the assemblies below the last, and elevator means 18 on the bed below the last and the mold assembly at this position operable to raise the mold assembly to a position of engagement with the bottom of the last.

Each mold assembly 16 comprises an adaptor 20 upon which is mounted and secured a bottom mold 22. The adaptor is a rectangular frame having spaced parallel, longitudinally extending sides 20a and spaced parallel, transversely extending ends 20b. The mold assemblies are seated on narrow ledges at the inner sides of the ends. The adaptors 20 are mounted in a tractor frame 24 of rectangular construction having spaced parallel, longitudinally extending sides 24a and spaced parallel, transversely extending ends 24b. The tractor frame 24 is divided by a rail 24c midway between its ends to receive the two adaptors 20, and is provided with lugs 26 at each of its sides 24a midway between its ends, to each of which is connected the forward end of a piston rod 28 protruding from one end of a cylinder 30 mounted in a horizontal position and secured at its opposite end to the machine frame 10. Fluid pressure supplied to the cylinders 30 in one direction will move the tractor frame to the left and in the other direction to the right and in each of the positions of the tractor frame one-half of the frame will be in confronting relation to the bottom of the last, that is, vertically below the last. Movement of the tractor frame longitudinally of the bed is limited by the stroke of the piston rods.

Below the tractor frame 24 on the bed 12 there are horizontally arranged, spaced parallel track sections 32 (three in number), substantially equally spaced transversely of the tractor frame at the left and right sides of the last, these track sections being fixed to the bed by supports 32A. Beneath the last there are additional track sections 36 which are secured to the elevator means at a spacing corresponding to that of the track sections 32. When the elevator means is at its lowermost position the track section 36 are at the same level as the track sections 32 and are aligned with them. The adaptors 20 rest upon the track sections and are slidable there along by movement of the tractor frame in one direction or the other to move one or the other of the mold assemblies from a lateral psition at one side of the last to a position beneath it and simultaneously to move the mold assembly that was under the last to a lateral position at the opposite side. When moved to a subjacent or confronting position with the bottom of the last the mold assembly may be raised by means of the elevator means 18 to bring it into engagement with the bottom of the last. The elevator means and the means for raising and lowering the elevator means is indicated schematically in FIGS. 1 and 2 as a plate 44 secured to the upper end of a piston rod 46. As constructed, it is possible to place one mold assembly in a position beneath the last to obtain a first injection to form, for example, an insole of uniform thickness, and then to place the other mold assembly in position beneath the last to form an outsole of a different thickness and embodying a forepart, shank and heel and possibly a tractive tread surface.

Optionally, molds of different configuration and provided with different surface treatments may be employed to be used alternately or in combination by the simple expedient of shifting the tractor frame carrying these molds laterally with respect to the bottom of a last to enable moving first one mold into confronting relation with the bottom of the last and thereafter to move the other mold into confronting relation with the last, and at said confronting position to enable freely raising each mold independently of the other to bring it into engagement with the bottom of the last for injection.

It is also desirable to be able to vary the thickness of the bottom and/or pressure and also to permit a certain amount of expansion in the event that it is desirable to form a cushion sole. Accordingly, as shown in greater detail in FIGS. 4 and 5, each mold assembly 22 comprises a ring 48 and sole plate 50. The ring 48 is secured to the adaptor 20 by suitable means (not shown) and the latter has along its opposite longitudinal sides grooves 51 which are slidably engaged with the track sections at the opposite sides so as to be movable from the fixed track section at either end onto the movable track sections beneath the last. The sole plate 50 is mounted on a bracket plate 52 having at its underside a downwardly extending land 54 containing a rectangular groove 54a slidably engaged with the track sections at the center. The track sections hold the mold assemblies while they are being moved laterally and vertically. Desirably, but not necessarily, a heating or cooling plate 56 may be interposed between the sole plate 50 and the bracket plate 52.

The elevator means and the means for raising and lowering it, schematically disclosed in FIGS. 1 and 3, for raising and lowering the mold assemblies, comprises the elevator plate 44 upon which the adaptor 20 rests and four piston rods 46a extending through the bed from the upper ends of four cylinders 58 attached to the underside of the bed at the four corners of the elevator plate 44. Pressure supplied to the lower ends of the cylinders will raise the plate 44 from the position shown in FIG. 4 to the position shown in FIG. 5, where the open top of the mold ring is engaged with the bottom of the last, or with an upper forming mold 22a surrounding the last if the apparatus is designed, for example, to make a shoe in which the upper as well as the bottom is formed by injection molding. The mold assembly is lowered by venting the fluid pressure from the cylinders 58 and supplying pressure to the upper side of a piston 66 contained within a cylinder 68 provided at the lower side of the bed. The piston 66 is connected by a hollow piston rod 70 to the underside of the elevator plate 44 and extends downwardly therefrom through an opening 72 in the bed.

The raising and lowering of the sole plate relative to the ring 48 when the mold assembly has been raised to its position of engagement with a last or upper mold is provided for by a piston rod 74 which is mounted in the hollow piston rod 70. The lower end of the piston rod 74 extends downwardly into a cylinder 76 mounted on the lower side of the piston 66 and the upper end extends upwardly through the elevator plate 44. At the lower end of the piston rod 74 there is a piston 78 which is contained by the cylinder 76. The middle one of the midtrack sections 36 is secured to the upper end of the piston rod 74, so that by moving the piston rod 74 relative to the piston rod 70 the sole plate may be raised and lowered relative to the elevator plate 44 and hence to the mold ring 48. It is thus possible when the mold assembly is raised to a position for injection to raise and lower the sole plate relative to the ring to provide for first and second injections of different thickness and/or to provide for expansion of the injected bottom-forming material in the event that it is desirable to have a cushion sole, or to provide for a layer of greater or lesser density and also in certain instances to achieve a greater pressure between the injected material and the bottom of the upper to insure a permanent bond.

As pointed out above, this apparatus may be used to apply bottoms by injection molding to an upper mounted on a last, for example, a fabric or leather upper, string-lasted or otherwise secured to the last. The first injection may be with a mold assembly provided with a sole plate which is flat so as to apply a substantially uniformly thick, flat inner layer or midsole directly to the upper material, as shown in FIG. 7, and thereafter by shifting of a mold assembly having a sole plate with a contoured bottom designed to provide for an outsole embodying a forepart, shank and heel to apply an outsole to the insole to complete the shoe.

A compound unattached bottom may be formed as thus described (FIG. 8) by omitting the upper and forming the inner sole against the bottom of the naked last and then forming the outsole against the insole.

Some footwear is comprised exclusively of plastic, that is, both the upper and the bottom are formed of plastic by injection molding and the apparatus as related above is capable of such use by the simple expedient of providing an upper mold 22a, as shown in FIG. 4, in conjunction with the last.

It is evident from the foregoing that this apparatus provides a very simple and semiautomatic piece of equipment for applying plastic bottoms of different thickness and/or kind, that is, insoles and outsoles of varying thickness and configuration, density, color and the like to uppers comprised of fabrics, natural leather or plastic.

It should be understood that the present disclosure is for the purpose of illustration only and that this invention includes all modifications and equivalents falling within the scope of the appended claims.

We claim:

1. Molding apparatus comprising the combination of a last upon which an upper is adapted to be mounted for attachment of a bottom to the upper, and open top mold assemblies of variable depth for receiving a bottom-forming composition, said mold assemblies being alternatively movable transversely with respect to the longitudinal median line of the last from a lateral position to a position confronting the bottom of the last, and each bottom mold assembly being movable relative to the bottom of the last while at said confronting position to bring its open top into engagement with the bottom of the last.

2. Apparatus according to claim 1, comprising means at said confronting position for varying the depth of the mold cavity.

3. Apparatus according to claim 1, wherein each mold assembly comprises a ring and a sole plate movable relative thereto, comprising a movable support at said position confronting the bottom of the last mounting the ring and sole plate for movement in unison relative to the bottom of the last to raise the mold assembly to a position such that the open top engages the bottom of the last, power-operable means for effecting raising and lowering of said movable support, and power-operable means on the support for raising and lowering the sole plate relative to the ring.

4. Apparatus according to claim 3, comprising lateral supports at opposite sides of the movable support, said lateral supports being fixed at a predetermined level with respect to the bottom of the last and said movable support being movable from said level toward and from the bottom of the last, and means operable to move the mold assemblies in unison alternately to position one of the assemblies on the movable support and the other on one of the fixed supports.

5. Apparatus according to claim 4, wherein said last-named means comprises a tractor frame movable parallel to the fixed and movable supports in a direction transverse to the longitudinal median line of the last within which the mold assemblies are contained, aligned tandemly in the direction of movement, and power-operable means for effecting movement of the tractor frame transversely with respect to the longitudinal median line of the last to move each mold assembly in turn from one of the fixed supports to the movable support and vice versa.

6. Apparatus according to claim 1, comprising a tractor frame supported for movement transversely with respect to the longitudinal median line of the last, means mounting the mold assemblies on the tractor frame in tandem in relation to the direction of movement thereof, and power-operable means operably connected to the tractor frame operable to effect movement of the tractor frame relative to the last.

7. Apparatus according to claim 6, wherein said means mounting the mold assemblies comprise adaptors on the tractor frame mounting the mold assemblies tandemly in the direction of movement of the frame, each adaptor being movable from the tractor frame when situated in a confronting relation toward the last, each mold assembly comprising a ring and a sole plate movable relative thereto, means securing the ring to the adaptor, means movable with the movable support and relative thereto operably connected to the sole plate, and operable to effect movement of the sole plate relative to the ring.

8. Apparatus according to claim 5, comprising means on the fixed and movable supports slidably engaged with the mold assemblies, said means on the fixed support holding the mold assemblies within the tractor during lateral movement thereof, and said means on the movable support holding the mold assemblies for movement with the movable support from the tractor toward the bottom of the lasted upper while the tractor is stationary.

9. Apparatus according to claim 5, wherein there is means on the fixed and movable supports comprising three transversely spaced, longitudinally extending tracks, means on the mold assemblies slidably engaged with the tracks operable to hold the mold assemblies within the tractor frame while the latter is being moved laterally, and to hold the mold assembly on the movable support for movement therewith relative to the tractor frame in a direction perpendicular to the bottom of the last when the tractor frame is stationary, means on the sole plate of the mold assembly slidably engaged with the intermediate one of the tracks during the lateral movement of the mold assemblies to hold the sole plates at a predetermined level with respect to the rings, said intermediate one of the tracks on the movable support being movable in unison with the tracks parallel thereto, and means mounting the intermediate one of the tracks on said movable support for movement relative to the tracks parallel therewith to effect movement of the sole plate relative to the ring.

10. Apparatus for molding comprising a machine frame having a substantially flat horizontal bed, fixed and movable supports on the bed, the movable support being situated between the fixed supports and at the same level, a last supported above the movable support, two mold assemblies mounted on the supports tandemly for movement transversely with respect to the longitudinal median line of the last, means on the frame for movement transversely with respect to the median line of the last, said means being operable to effect movement of the mold assemblies in unison to position first one assembly and then the other on the movable support while simultaneously positioning the other mold assembly laterally thereof on one of the other of the fixed supports, and means for effecting movement of the movable support relative to said first means toward the last comprising cylinder and piston assemblies mounted on the bed embodying piston rods engaged with the movable support, said piston rods being movable by supplying pressure to the cylinders to raise the movable support and the mold assembly supported thereby toward the bottom of the last.

11. Apparatus according to claim 10, wherein the means for effecting movement of the mold assemblies in unison relative to the supports comprises a tractor containing the mold assemblies, said mold assemblies being movable relative to the tractor in a direction perpendicular to the path of movement of the tractor, each mold assembly comprising a ring and sole plate movable relative thereto, cylinder and piston assemblies including rods mounted on the bed with the axes of the rods parallel to the supports and connected at their distal ends to the tractor for effecting movement thereof, and a cylinder and piston assembly including a piston rod mounted on the movable support with its axis perpendicular thereto to which the sole plate is connected, operable to move the sole plate relative to the mold ring while the mold assembly is in said elevated position.

12. Apparatus according to claim 10, comprising a cylinder and piston assembly including a piston rod connected at one end to the movable support and extending downwardly therefrom through the bed into a cylinder at the underside of the bed, and a piston on the rod within said cylinder at the underside of the bed to which pressure may be supplied to move the movable support downwardly.

13. Apparatus according to claim 12, wherein the piston rod extending from the lower side of the movable support is axially hollow, a cylinder is mounted on the piston, and the piston rod to which the sole plate is connected extends through said hollow piston rod into the cylinder and has on it a piston.

14. Apparatus for applying multi-layer bottoms to a shoe upper mounted on a last comprising a machine frame, a substantially horizontal bed on the frame, a last supported by the frame above and in spaced relation to the bed, a tractor on the bed movable transversely with respect to the longitudinal median line of the last, two mold assemblies mounted tandemly on the tractor for movement therewith to position one or the other beneath the last, said mold assemblies being independently movable from the tractor when situated beneath the last upwardly into engagement with the bottom of the last, first means on the bed below the last operable to elevate the mold assembly situated below the last from the tractor, second means on the bed operable to lower said mold assembly from the last onto the tractor, each mold assembly comprising a ring and sole plate movable relative to each other, and third means operable to effect movement of the sole plate relative to the ring while said mold assembly is supported in engagement with the bottom of the last.

15. Apparatus according to claim 14, comprising a track on the bed having movable and fixed portions, means mounting the fixed portions on the bed, a piston rod supporting the movable portion at the same level as the fixed portions, said tractor being adapted to move one or the other of the mold assemblies from a fixed portion to the movable portion, and a cylinder and piston assembly operably connected to the tractor to effect movement thereof.

References Cited

UNITED STATES PATENTS

| | | | |
|---|---|---|---|
| 1,607,073 | 11/1926 | Gross | 18—17 X |
| 3,102,286 | 9/1963 | Mimick. | |
| 3,342,624 | 9/1967 | Kamborian | 264—244 X |
| 3,343,223 | 9/1967 | Ludwig | 18—42 |
| 3,407,443 | 10/1968 | Beebee et al. | 18—30 |

WILBUR L. McBAY, Primary Examiner

U.S. Cl. X.R.

18—30; 264—244